United States Patent
Hayashi (10) Patent No.: US 10,456,684 B2
(45) Date of Patent: Oct. 29, 2019

(54) ATTENTION CONTROL FOR INFORMATION PROCESSING APPARATUS, INFORMATION PROCESSING SYSTEM, INFORMATION PROCESSING METHOD, NON-TRANSITORY COMPUTER-READABLE STORAGE MEDIUM STORING INFORMATION PROCESSING PROGRAM

(71) Applicant: NINTENDO CO., LTD., Kyoto (JP)

(72) Inventor: Yugo Hayashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 331 days.

(21) Appl. No.: 14/873,530

(22) Filed: Oct. 2, 2015

(65) Prior Publication Data

US 2016/0361649 A1    Dec. 15, 2016

(30) Foreign Application Priority Data

Jun. 12, 2015   (JP) ................................. 2015-119434

(51) Int. Cl.
*A63F 13/00* (2014.01)
*A63F 9/24* (2006.01)
(Continued)

(52) U.S. Cl.
CPC ........ *A63F 13/525* (2014.09); *A63F 13/5255* (2014.09); *A63F 13/5258* (2014.09); *A63F 2300/204* (2013.01)

(58) Field of Classification Search
CPC . A63F 13/525; A63F 13/5255; A63F 13/5258
See application file for complete search history.

(56) References Cited

U.S. PATENT DOCUMENTS 6,165,073 A * 12/2000 Miyamoto et al. ..... A63F 13/10
463/31
6,504,539 B1 * 1/2003 Hiraki ..................... A63F 13/10
345/427

(Continued)

FOREIGN PATENT DOCUMENTS

| JP | 11-128533 | 5/1999 |
| JP | 2001-034247 A | 2/2001 |
| JP | 2006-268511 A | 10/2006 |

OTHER PUBLICATIONS

Sasuki, T. et al., "Aerodancing F Official Guide", Mar. 2, 2000, pp. 20-25 and 144, A Soft Bank Publishing Company.

(Continued)

*Primary Examiner* — Lawrence S Galka
(74) *Attorney, Agent, or Firm* — Scully, Scott, Murphy & Presser, P.C.

(57) ABSTRACT

Provided is an information processing apparatus that controls a virtual camera to shoot an attention object without restriction on the degree of freedom of operation of a player object. A game apparatus generates an image virtually captured by the virtual camera in a virtual space. A game operation unit controls at least a position of the player object in the virtual space on the basis of an input by a player. A virtual camera setting unit controls the virtual camera in such a manner that at least any one of the player object and an attention enemy object is included in an imaging range on the basis of a position of the player object and a position of the attention enemy object. A game operation unit controls the player object on the basis of the input by the player regardless of control of the virtual camera.

24 Claims, 7 Drawing Sheets

(51) Int. Cl.
*A63F 13/525* (2014.01)
*A63F 13/5258* (2014.01)
*A63F 13/5255* (2014.01)

(56) References Cited

U.S. PATENT DOCUMENTS

| | | | | |
|---|---|---|---|---|
| 2004/0209684 | A1* | 10/2004 | Hisano | A63F 13/10 463/32 |
| 2005/0009602 | A1* | 1/2005 | Nishimura | A63F 13/10 463/30 |
| 2005/0266921 | A1* | 12/2005 | Hayashida | A63F 13/10 463/33 |
| 2008/0207324 | A1* | 8/2008 | Hiroshige | A63F 13/10 463/33 |
| 2009/0247250 | A1* | 10/2009 | Kato | A63F 13/10 463/2 |
| 2009/0262112 | A1* | 10/2009 | Yoshimura | A63F 13/10 345/427 |
| 2011/0113383 | A1* | 5/2011 | Dyack | A63F 13/10 715/850 |
| 2012/0007882 | A1* | 1/2012 | Sakurai | G06F 3/04815 345/619 |
| 2012/0190447 | A1* | 7/2012 | Maeno | G06Q 30/02 463/31 |
| 2012/0249424 | A1* | 10/2012 | Bove | A63F 13/26 345/158 |
| 2013/0065682 | A1* | 3/2013 | Izuno et al. | A63F 13/00 463/43 |
| 2013/0225289 | A1* | 8/2013 | Yoshimitsu | A63F 13/10 463/31 |
| 2015/0031450 | A1* | 1/2015 | Matsuura | A63F 13/00 463/31 |

OTHER PUBLICATIONS

Official Action dated Mar. 19, 2019 received from the Japanese Patent Office in application JP 2015-119434.

* cited by examiner

ATTENTION CONTROL FOR INFORMATION PROCESSING APPARATUS, INFORMATION PROCESSING SYSTEM, INFORMATION PROCESSING METHOD, NON-TRANSITORY COMPUTER-READABLE STORAGE MEDIUM STORING INFORMATION PROCESSING PROGRAM

CROSS REFERENCE TO RELATED APPLICATION

This application claims the benefit of Japanese Priority Patent Application No. 2015-119434 filed Jun. 12, 2015, the entire contents of which are incorporated herein by reference.

FIELD

The technology herein relates to an information processing apparatus that generates an image obtained by virtually imaging a player object and a predetermined object in a virtual space by using a virtual camera in the virtual space, an information processing system, an information processing method, and a non-transitory computer-readable storage medium that stores an information processing program.

BACKGROUND AND SUMMARY

This application describes a video game (hereinafter, simply referred to as a "game") that progresses while a player object is moved in a virtual space. In the virtual space, objects other than player object, such as enemy objects and construction objects, are set.

In this video game, a virtual camera is set in the virtual space, and a picture of the virtual space, which is obtained by imaging the virtual space by using the virtual camera, is displayed on a game screen. A player plays a game by operating a controller while viewing the game screen. Typically, the virtual camera is set in such a manner that a position, an imaging direction, an angle of view, and the like are variable in accordance with a position and a traveling direction (posture) of the player object.

With regard to a method of controlling the virtual camera, there is a known a video game provided with an attention function capable of paying attention to a specific object (for example, a specific enemy object) in the virtual space, that is, a function of automatically determining a position and a direction of the virtual camera in such a manner that an attention object appears on the game screen while the virtual camera is changing a position and a direction so as to follow a player object.

However, in the video game of the related art, a predetermined restriction is imposed on a direction of the player object, and thus the degree of freedom of operation of the player object is restricted. That is, the position and the direction of the virtual camera are controlled in such a manner that the attention object is shot over the player object from behind the player object, but the direction of the player object is also restricted so as to always face the attention object.

In addition, in the video game of the related art, in a case where when the player object is made to move in a right and left direction, a distance between the player object and the attention object is fixed. Therefore, the movement of the player object is restricted onto the circumference of a circle centering around the attention object, and thus it is difficult for the player object to move in an inclination direction with respect to the attention object. Accordingly, also from this viewpoint, the degree of freedom of the operation of the player object is also restricted.

The technology provides an information processing apparatus which controls a virtual camera so as to shoot an attention object without a restriction on the degree of freedom of operation of a player object, an information processing system, an information processing method, and a non-transitory computer-readable storage medium that stores an information processing program.

According to an example embodiment, there is provided an information processing apparatus that generates an image obtained by imaging a player object and a predetermined object in a virtual space by using a virtual camera, the information processing apparatus comprising: at least one processor, the at least one processor being configured to control at least a position of the player object on the basis of an input by a player, and the at least one processor being further configured to control the virtual camera in such a manner that at least any one of the player object and the predetermined object is included in an imaging range on the basis of the position of the player object and a position of the predetermined object, wherein the at least one processor is configured to control the player object on the basis of the input regardless of the control of the virtual camera.

According to this configuration, the virtual camera is controlled in such a manner that at least any one of the player object and the predetermined object is included in the imaging range on the basis of the position of the player object and the predetermined object in the virtual space, but the player object is controlled on the basis of the input by the player regardless of the control of the virtual camera. According to this, the degree of freedom of operation of the player object is improved. The configuration in which at least any one of the player object and the predetermined object is included in the imaging range also includes a configuration in which a part of at least any one of the player object and the predetermined object is included in the imaging range. That is, at least a part of at least any one of the player object and the predetermined object is included in the imaging range.

The at least one processor may be configured to control at least one of a position, a direction, and an angle of view of the virtual camera. According to this configuration, at least one of the position, the direction, and the angle of view of the virtual camera is controlled in such a manner that at least any one of the player object and the predetermined object is included in the imaging range.

The at least one processor may be configured to select the predetermined object among objects in the virtual space on the basis of an input by the player. According to this configuration, the player can select the predetermined object, which is included in the imaging range of the virtual camera, in the virtual space.

The at least one processor may be configured to carry out the control of the virtual camera on the basis of an input by the player. According to this configuration, a player can initiate the control of the virtual camera in an arbitrary manner.

The at least one processor may be configured to continue the control of the virtual camera during the period in which the input for the control of the virtual camera continues. According to this configuration, during the period in which the input by the player such as pressing of a button continues, the control of the virtual camera, which is carried out by a virtual camera control unit, continues in such a manner that at least any one of the player object and the predetermined object is included in the imaging range.

The at least one processor may be configured to release the control of the virtual camera when the input for the control of the virtual camera is released. According to this configuration, when the input by the player such as the pressing of a button is released, the control of the virtual camera, which is carried out by a virtual camera control unit in such a manner that at least any one of the player object and the predetermined object is included in the imaging range, is released.

The at least one processor may be configured to continue the control of the virtual camera after an input for initiation of the control of the virtual camera is performed until an input for release of the control of the virtual camera is performed. According to this configuration, it is not necessary to continue the input such as the pressing of a button for control of the virtual camera.

The at least one processor may be configured to release the control of the virtual camera when the predetermined object satisfies a predetermined release condition. According to this configuration, in a case where the predetermined object is attacked and disappears, it is possible to release the control of the virtual camera which is carried out in such a manner that at least any one of the player object and the predetermined object is included in the imaging range.

The at least one processor may be configured to control the virtual camera in such a manner that both the player object and the predetermined object are included in the imaging range. According to this configuration, even when the player object moves, the predetermined object can be included in the imaging range. The situation in which both the player object and the predetermined object are included in the imaging range includes a situation in which a part of the player object and a part of the predetermined object are included in the imaging range. That is, both at least a part of the player object and at least a part of the predetermined object are included in the imaging range.

The at least one processor may be configured to control the virtual camera in such a manner that the predetermined object is included in the vicinity of the center of the imaging range. According to this configuration, a captured image, in which the predetermined object exists in the vicinity of the center, is obtained.

The at least one processor may be configured to control the virtual camera in such a manner that the player object is included in the vicinity of the center of the imaging range. According to this configuration, a captured image, in which the player object exists in the vicinity of the center, is obtained.

The at least one processor may be configured to move the virtual camera toward a target position based on a positional relationship between the player object and the predetermined object. According to this configuration, a position of the player object varies on a captured screen, and thus operability of the player object is improved. The virtual camera may linearly move from a current position to a current target position, or may move on a past target position trajectory from the current position to the current target position.

The at least one processor may be configured to control a direction of the virtual camera so as to face a point between the player object and the predetermined object. According to this configuration, a situation, in which both the player object and the predetermined object are included in the imaging range, further increases in comparison to a case where the virtual camera faces either the play object or the predetermined object.

The information processing apparatus may generate an image that is obtained by virtually imaging the virtual space by using a virtual camera that is separate from other virtual camera. According to this configuration, it is possible to display a plurality of images from viewpoints which are different from each other by using a plurality of display devices.

The separate other virtual camera may be controlled in accordance with a direction of the player object. According to this configuration, a subjective viewpoint image is provided.

A captured image of the separate other virtual camera may be displayed on a portable display device that includes an input section for an input by a player. According to this configuration, it is possible to display the subjective viewpoint image on a controller.

According to another example embodiment, there is provided an information processing system that generates an image obtained by imaging a player object and a predetermined object in a virtual space by using a virtual camera, the information processing system including: a controller; and at least one processor, the at least one processor being configured to control at least a position of the player object on the basis of an input to the controller by a player, the at least one processor being further configured to control the virtual camera in such a manner that at least any one of the player object and the predetermined object is included in an imaging range on the basis of the position of the player object and a position of the predetermined object, and the at least one processor being further configured to generate an image captured by the virtual camera, wherein the at least one processor is configured to control the player object on the basis of the input regardless of control of the virtual camera.

According to this configuration, the virtual camera is also controlled in such a manner that at least any one of the player object and the predetermined object is included in the imaging range on the basis of the position of the player object and the predetermined object in the virtual space, but the player object is controlled on the basis of the input by the player regardless of the control of the virtual camera. According to this, the degree of freedom of operation of the player object is improved.

According to still another example embodiment, there is provided an information processing method of generating an image obtained by imaging a player object and a predetermined object in a virtual space by using a virtual camera, including: receiving an input by a player; controlling at least a position of the player object on the basis of the input; and controlling the virtual camera in such a manner that at least any one of the player object and the predetermined object is included in an imaging range on the basis of the position of the player object and a position of the predetermined object, wherein in the controlling of the position of the player object, the player object is controlled on the basis of the input regardless of the control of the virtual camera.

According to this configuration, the virtual camera is also controlled in such a manner that at least any one of the player object and the predetermined object is included in the imaging range on the basis of the position of the player object and the predetermined object in the virtual space, but the player object is controlled on the basis of the input by the player regardless of the control of the virtual camera. According to this, the degree of freedom of operation of the player object is improved.

According to still another example embodiment, there is provided a non-transitory computer-readable recording medium that stores an information processing program of generating an image obtained by imaging a player object and a predetermined object in a virtual space by using a virtual camera, the information processing program allowing a computer to function as at least one processor, the at least one processor being configured to control at least a position of the player object on the basis of an input by a player, and the at least one processor being further configured to control the virtual camera in such a manner that at least any one of the player object and the predetermined object is included in an imaging range on the basis of the position of the player object and a position of the predetermined object, wherein the at least one processor is configured to control the player object on the basis of the input regardless of control of the virtual camera.

According to this configuration, the virtual camera is also controlled in such a manner that at least any one of the player object and the predetermined object is included in the imaging range on the basis of the position of the player object and the predetermined object in the virtual space, but the player object is controlled on the basis of the input by the player regardless of the control of the virtual camera. According to this, the degree of freedom of operation of the player object is improved.

DETAILED DESCRIPTION OF NON-LIMITING EXAMPLE EMBODIMENTS

Hereinafter, Example embodiment will be described with reference to the accompanying drawings. Further, the following Example embodiment illustrates an example of a case of executing the technology, and the technology is not limited to the following specific configuration. A specific configuration in correspondence with an embodiment may be appropriately employed during execution of the technology.

Hereinafter, description will be given of an example in which an information processing system including an information processing apparatus is applied as a game system, but the information processing system is not limited to the game system. The information processing system may be a system that controls a virtual camera that is set in a virtual space. For example, the information processing system may be a simulation system that simulates the movement of an object in the virtual space.

Figure 1:
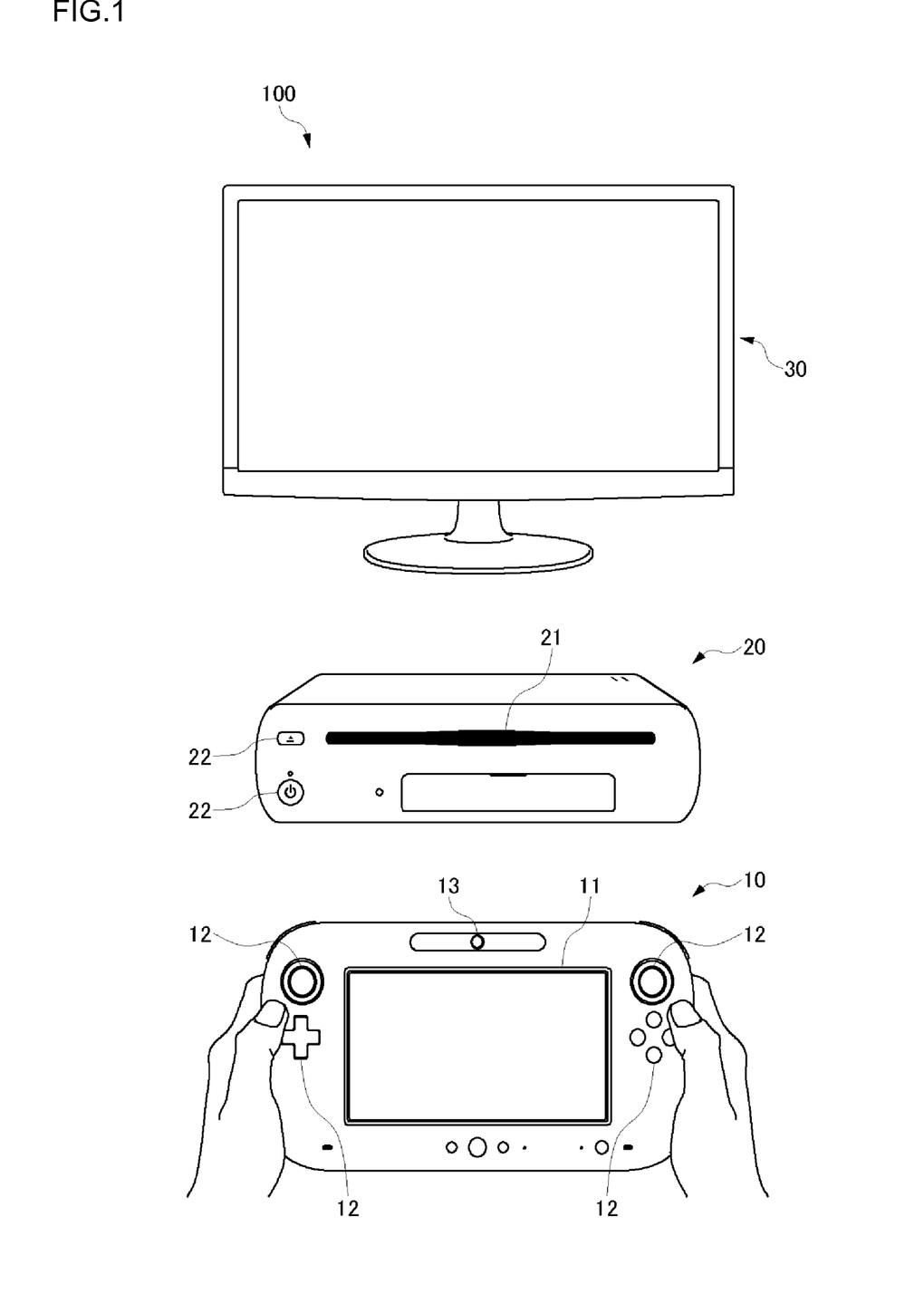
FIG. 1 shows an example non-limiting external configuration of a game system.

FIG. 1 shows an example non-limiting external configuration of a game system. A game system 100 as an information processing system includes a controller 10, a game apparatus (main body) 20 as an information processing apparatus, and a display device 30. Data transmission and reception is carried out between the controller 10 and the game apparatus 20 through wireless communication. In addition, the game apparatus 20 is connected to the display device 30 by a cable, and data of a game screen is transmitted to the display device 30.

As illustrated in FIG. 1, the controller 10 is configured to be operated by a user in hands. The controller 10 has a pad shape (plate shape), and is provided with a controller screen 11 at the center and an operation member 12 such as a button and a stick at the periphery. Each operation member 12 is disposed at a position capable of being operated by fingers of both hands when a user grips the controller screen 11 with the both hands in a state in which the controller screen 11 faces the user.

The controller screen 11 is also configured as a touch panel, and thus the user can carry out various inputs through touch operation with respect to the controller screen 11. In addition, the controller 10 is also provided with a camera 13.

The game apparatus 20 has an approximately rectangular shape, and a slot 21 for a recording medium, various buttons 22, and various terminals (not illustrated in the drawing) are provided to the game apparatus 20. As the display device 30, a television monitor having a terminal for connection with the game apparatus 20 can be used.

Figure 2:
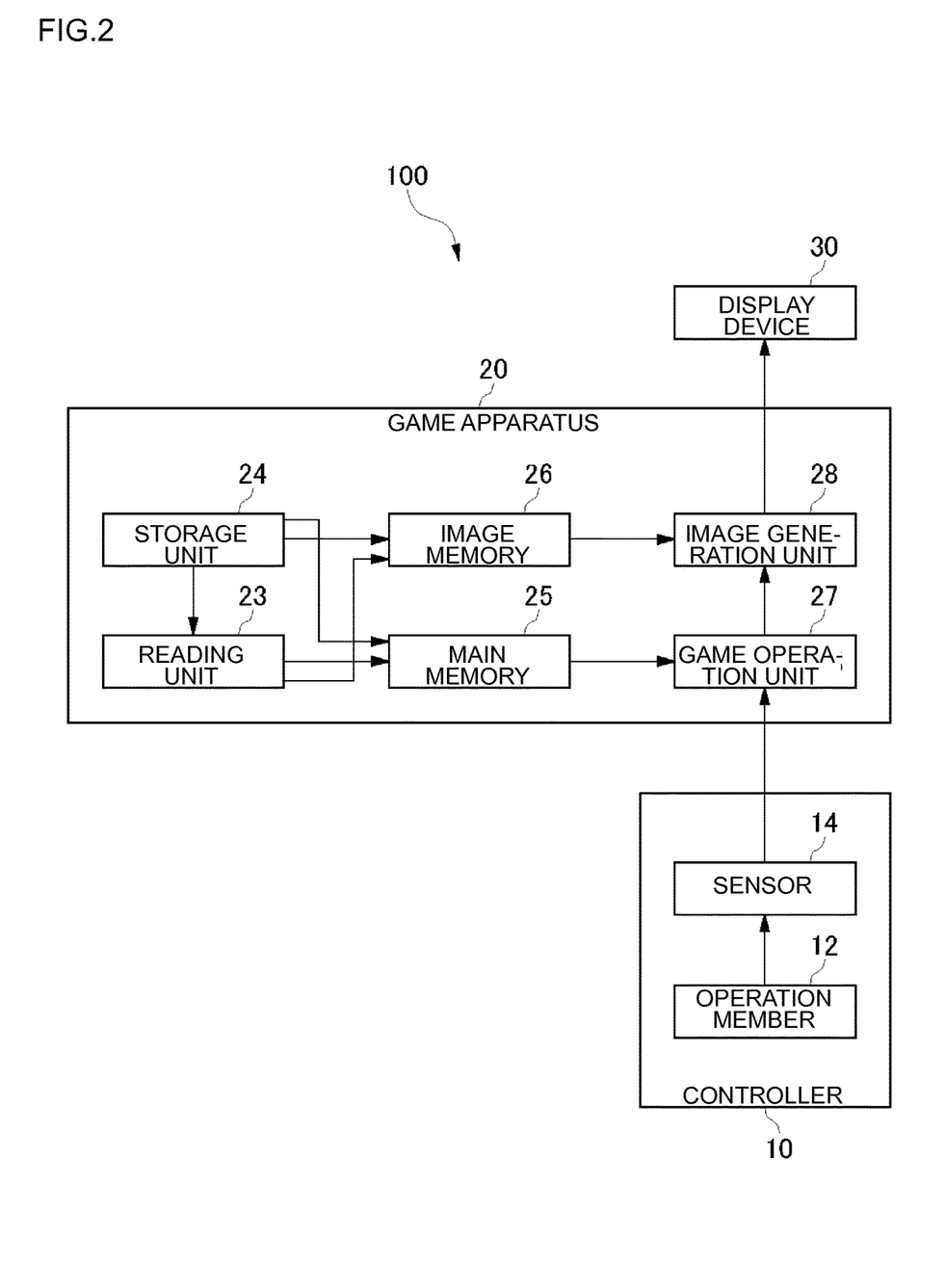
FIG. 2 shows an example non-limiting block diagram illustrating a configuration of the game system.

FIG. 2 shows an example non-limiting block diagram illustrating a configuration of the game system 100. In FIG. 2, only constituent elements, which are necessary for description of this example, are illustrated, and other configurations are not illustrated. The controller 10 includes the operation member 12 and a sensor 14. The sensor 14 detects an operation of the operation member 12 as an input from the user. For example, the sensor 14 detects pressing of a button as the operation member 12, and detects tilting of a stick as the operation member 12. The sensor 14 wirelessly transmits the user's input, which is detected, to the game apparatus 20 as an input signal.

The game apparatus 20 includes a reading unit 23, a storage unit 24, a main memory 25, an image memory 26, a game operation unit 27, and an image generation unit 28. The reading unit 23 reads data that is recorded in a recording medium (for example, a disc, a cartridge, and the like), which is inserted into the slot 21 for a recording medium, from the recording medium. In this example, a game program or game data is recorded in the recording medium, and is read by the reading unit 23. The game data includes graphic information that describes a three-dimensional virtual space and an object (including a player object and an enemy object) in the virtual space, which are used in the game.

The reading unit 23 stores the game program and the game data, which is read from the recording medium, in the storage unit 24, or the reading unit 23 loads the game program and the game data into the main memory 25 and the image memory 26. The storage unit 24 stores the game program and the game data that is read by the reading unit 23. The game apparatus 20 may be provided with a network communication function that is connected to the Internet and carries out communication. The game program and/or the game data may be downloaded from a server through the network. In this case, the game program and the game data, which are downloaded in this manner, are stored in the storage unit 24.

The game operation unit 27 carries out a game process on the basis of the game program or the game data. However, in this case, the game program and the game data are read out from the recording medium or the storage unit 24 by the reading unit 23, and are loaded into the main memory 25 and the image memory 26.

The game operation unit 27 uses the main memory 25 for the game process that is carried out in accordance with the game program. In addition, the image generation unit 28 generates an image (picture) that is displayed on the display device 30 in accordance with the game program, and uses the image memory 26 for the image generation process. The main memory 25 and the image memory 26 may be the same memory.

The game operation unit 27 is a processor that carries out an operation process in accordance with the game program, and the game data and an input signal that is input from the controller 10. A result of the game process in the game operation unit 27 is received by the image generation unit 28. The image generation unit 28 is a processor that generates a game image, which is displayed on the display device 30, in accordance with the result of the game process and by using the game data that includes graphic information. The game image, which is generated by the image generation unit 28, is output to the display device 30. The game operation unit 27 and the image generation unit 28 may be configured by the same processor or processors separate from each other.

The game in this example is a flight shooting game that is played in a virtual three-dimensional space. The object of the game is to clear a stage by operating one's flight vehicle, which flies in a three-dimensional space, as a player object, and by attacking an enemy flight vehicle that is the enemy object. Hereinafter, a user who plays the game is referred to as a player.

In the flight shooting game, generally, a virtual camera moves in accordance with movement of the player object, and changes the direction thereof in accordance with a change in a direction of the player object. Examples of a game screen of the flight shooting game include a subjective viewpoint screen in which the positions of the player object and the virtual camera are the same as each other, and an objective viewpoint screen in which the positions of the player object and the virtual camera are different from each other.

In a case where the player object is a conveyance such as a flight vehicle, the subjective viewpoint screen is a screen that shows a virtual space viewed from the viewpoint of the pilot. In a case where the player object is a biological object, the subjective viewpoint screen is a screen that shows a virtual space viewed from the viewpoint of the biological object itself. Typically, in the subjective viewpoint screen, a direction of the player object and a direction of the virtual camera equal to each other, but the direction of the player object and the direction of the virtual camera may not be equal to each other. In a case where the direction of the player object and the direction of the virtual camera are different from each other, for example, a subjective viewpoint image during proceeding toward a lateral side is obtained. In a case where the direction of the player object and the direction of the virtual camera are equal to each other, the direction of the virtual camera is controlled in accordance with the direction (posture) of the player object.

On the other hand, in an objective viewpoint image, typically, the virtual camera is located on a rear side of the player object, and the objective viewpoint image becomes an image that shoots a virtual space over the player object while shooting at least a part of the player object from the rear side. Also in the objective viewpoint image, typically, the direction of the player object and the direction of the virtual camera are equal to each other, but the direction of the player object and the direction of the virtual camera may not be equal to each other. In the game system 100 of this example, the subjective viewpoint image is displayed on the controller screen 11 of the controller 10, and the objective viewpoint image is displayed on the display device 30. Hereinafter, description will be given of the objective viewpoint image that is displayed on the display device 30.

Attention Function

In the game of this example, there is provided an attention function capable of paying attention to a specific object (for example, a specific enemy object) in the virtual space, that is, a function of automatically determining a position and a direction of the virtual camera in such a manner that an object as an attention object is included in the game screen while changing the position and the direction in combination with the player object.

Figure 3:
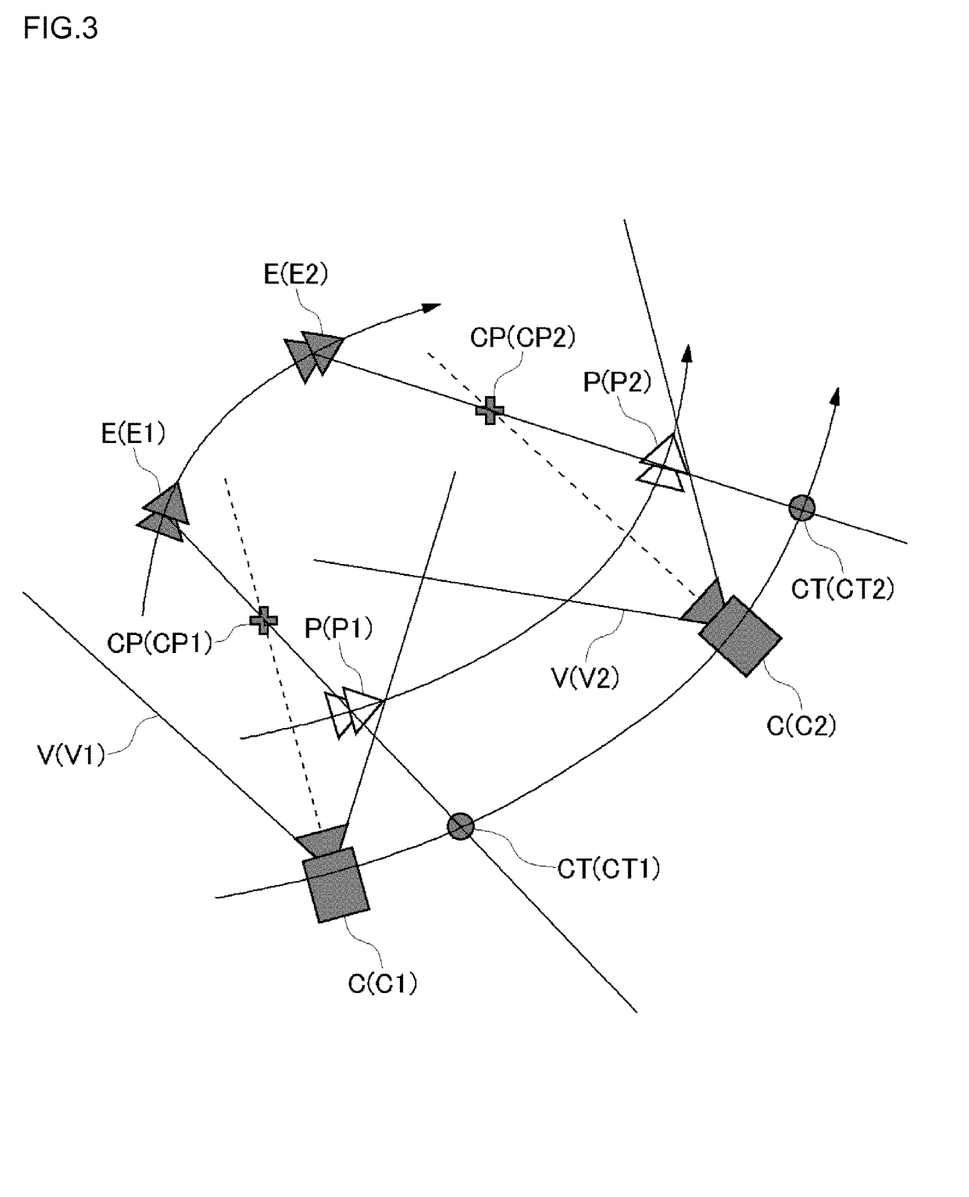
FIG. 3 shows an example non-limiting diagram illustrating an attention function.

FIG. 3 shows an example non-limiting diagram illustrating the attention function. An example of FIG. 3 illustrates a positional relationship between a player object P, an enemy object as the attention object (hereinafter, referred to as an "attention enemy object") E, and a virtual camera C in the virtual space. In the example of FIG. 3, at time T1, the player object P is located at a position P1, and the attention enemy object E is located at a position E1, and the virtual camera C is located at a position C1. At time T2 after time T1, the player object P moves to a position P2, and the attention enemy object E moves a position o E2, and the virtual camera C moves a position C2.

The virtual camera C is located on a rear side of the player object P with respect to the attention enemy object E, and can face a direction in which the player object P is located on a near side, and the attention enemy object E is located on a far side. In order words, the position of the virtual camera C is determined in such a manner that the player object P is located between the attention enemy object E and the virtual camera C, and the direction of the virtual camera C is determined in such a manner that both the player object P and the attention enemy object E enter an imaging range V.

Specifically, with regard to the virtual camera C, a position, which is on a line segment connecting the attention enemy object E and the player object P, and is spaced away from the player object P by a predetermined distance toward a side opposite to the attention enemy object E, is set as a target position CT, and the virtual camera C moves on a trajectory of the target position CT. However, the position of the virtual camera C is moved with a slight time delay from movement of the player object P and the attention enemy object E. In the example of FIG. 3, at time T1, a target position CT1 of the virtual camera C is set on a line connecting the player object P1 and the attention enemy object E1, but the virtual camera C is actually set to the position with a slight delay (for example, with a delay of 60 frames (one second)) from time T1. At time T1, the position of the virtual camera C is set to a position that is the target position CT before a predetermined time from the time T1.

The direction of the virtual camera C is set in such a manner that the center of an imaging range V faces the middle point between the player object P and the attention enemy object E at current time. In the example of FIG. 3, at the time T1, the direction of the virtual camera C1 is set in such a manner that the center of the imaging range V1 faces the middle point CP1 between the player object P1 at the time T1 and the attention enemy object E1 at the time T1. At time T2, the direction of the virtual camera C2 is set in such a manner that the center of an imaging range V2 faces a middle point CP2 between the player object P2 at the time T2, and the attention enemy object E2 at the time T2.

Figure 4:
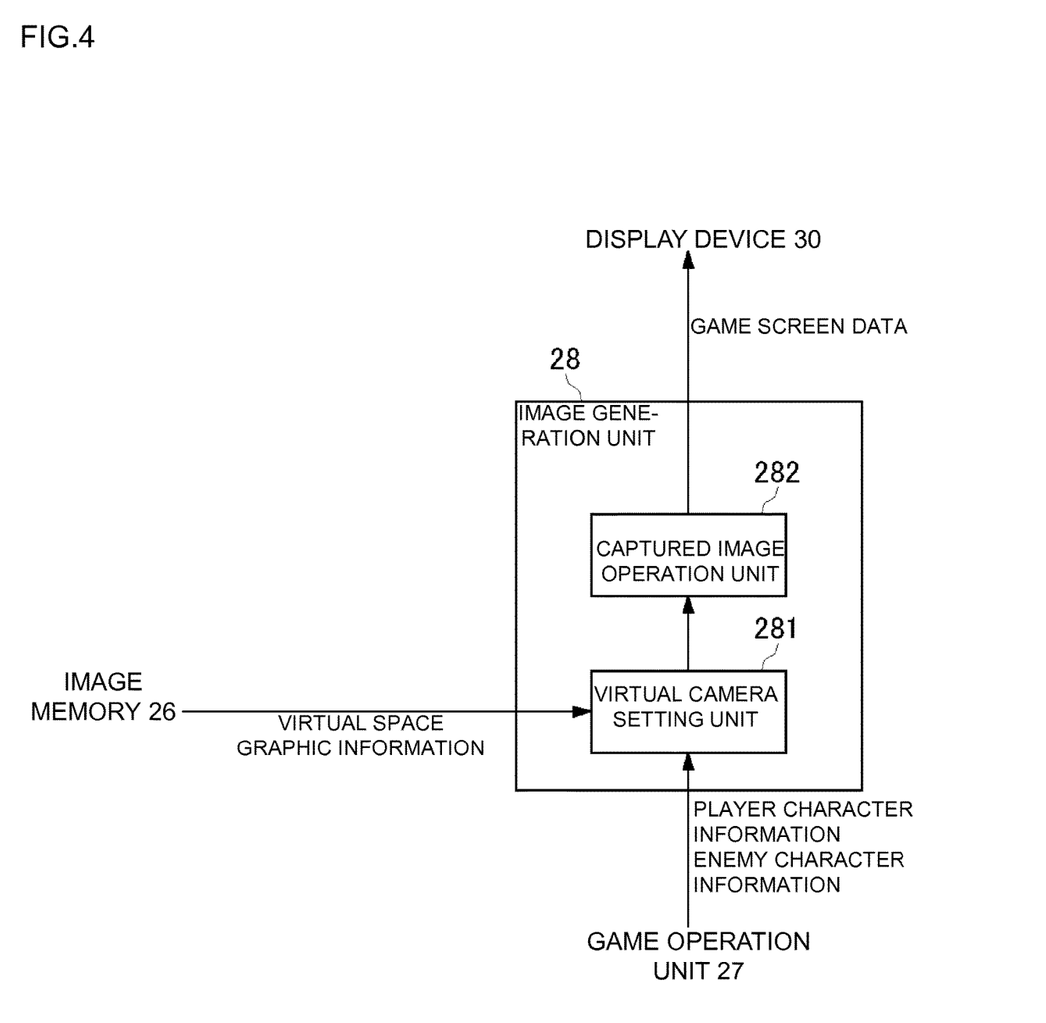
FIG. 4 shows an example non-limiting block diagram illustrating a configuration of an image generation unit.

FIG. 4 shows an example non-limiting block diagram illustrating a configuration of the image generation unit 28. The image generation unit 28 includes a virtual camera setting unit 281 and a captured screen operation unit 282. The virtual camera setting unit 281 acquires player object information and enemy object information from the game operation unit 27, and calculates the position and the direction of the virtual camera in accordance with graphic information of the virtual space which is acquired from the image memory 26 on the basis of the player object information and the enemy object information.

Here, the player object information includes information relating to the position and the direction of the player object P, and the enemy object information includes information relating to the position and the direction of the attention enemy object E. Information relating to the direction of the virtual camera C, the player object P, and the attention enemy object E represents which direction virtual camera C, the player object P, and the attention enemy object E face. With regard to the virtual camera C, the information represents a direction which the center of the imaging range V faces. With regard to the player object P and the attention enemy object E, the information represents a proceeding direction.

The virtual camera setting unit 281 calculates the target position CT of the virtual camera C on the basis of the positional relationship between the player object P and the attention enemy object E at a predetermined frame cycle (for example, 60 fps), sets the position of the virtual camera C to the target position CT before a predetermined number of frames (for example, before 60 frames), and sets the direction of the virtual camera C in such a manner that the center of the imaging range V faces the middle point CP between the player object P and the attention enemy object E.

The captured screen operation unit 282 generates a virtual captured screen that is obtained in a case of capturing an image with the virtual camera by using the position and the direction of the virtual camera which are set by the virtual camera setting unit 281, the player object information, the enemy object information, and the graphic information of the virtual space, and outputs the captured screen as game screen data.

As described above, the virtual camera setting unit 281 of this example set the virtual camera C, which provides an objective viewpoint image by the attention function, in such a manner that the virtual camera C is located on a rear side of the player object P with respect to the attention enemy object E, and the virtual camera C faces the middle point CP between the attention enemy object E and the player object P. According to this, even when the player object P and the attention enemy object E moves in the virtual space in an arbitrary manner, the captured screen operation unit 282 can generate a game screen in such a manner that the player object P is included in the game screen and the attention enemy object E as the attention object is included in the game screen on the far side of the player object P.

In addition, the virtual camera setting unit 281 in this example sets the position and the direction of the virtual camera C on the basis of the position of the player object P and the attention enemy object E regardless of the direction of the player object P or the direction of the attention enemy object E. Accordingly, even in a case where the attention function operates, the player can allow the player object P to face an arbitrary direction, and the player object P faces an arbitrary direction, which is designated by the player, also in the game screen. Accordingly, it is possible to provide a more natural objective viewpoint image as a game image.

Effect Due to Delay of Virtual Camera

In addition, the virtual camera setting unit 281 seeks for the target position CT on a line connecting a current position of the attention enemy object E and a current position of the player object P, and sets the position of the virtual camera C at the target position CT at time slightly before. That is, the position is set in such a manner that the virtual camera C follows the movement of the player object P with a slight delay.

If the delay is not present, the position of the player object P in the game screen is fixed, and thus it is difficult to obtain feeling of the player object P proceeding in a direction that is instructed. In contrast, as is the case with this example, when the virtual camera C follows the movement of the player object with a delay, the player object P proceeds in a proceeding direction in the game screen. For example, in a case where the player object P proceeds in the right direction of the game screen, the player object P appears on the right side of the game screen. According to this, it will be easy for the user to feel a moving speed of the player object P.

Modification Example of Delay of Virtual Camera

In the example, the virtual camera C is moved on the trajectory of the past target position CT toward the current target position CT, but the method of moving the virtual camera C toward the current target position CT with a delay from the current target position CT is not limited thereto.

The virtual camera C may directly proceed toward the current target position CT from a current position for each frame, and the virtual camera C may be moved by setting a position, which is reached after a straight line connecting the current position and the current target position CT proceeds from the current position by a predetermined ratio (for example, ⅟60), as a position of the virtual camera C of a next frame. In this case, the virtual camera setting unit 281 calculates a position, which internally divides the line segment connecting the current position of the virtual camera C and the current target position CT by a predetermined ratio (for example, 1:59), as a position of the virtual camera C of a next frame, and outputs the position to the captured screen operation unit 282.

Movement of Player Object in Depth Direction

As described above, the virtual camera C follows the movement of the player object P with a slight delay, and thus when the player object P moves in a direction away from the virtual camera C with the virtual camera C left as is. As a result, a distance between the virtual camera C and the player object P increases, and thus the player object P in the game image looks slightly small. In contrast, when the player object P moves in a direction to be close to the virtual camera C, the virtual camera C is followed by the player object P, and thus the distance between the virtual camera C and the player object P decreases, and thus the player object P in the game image looks slightly large.

Figure 5:
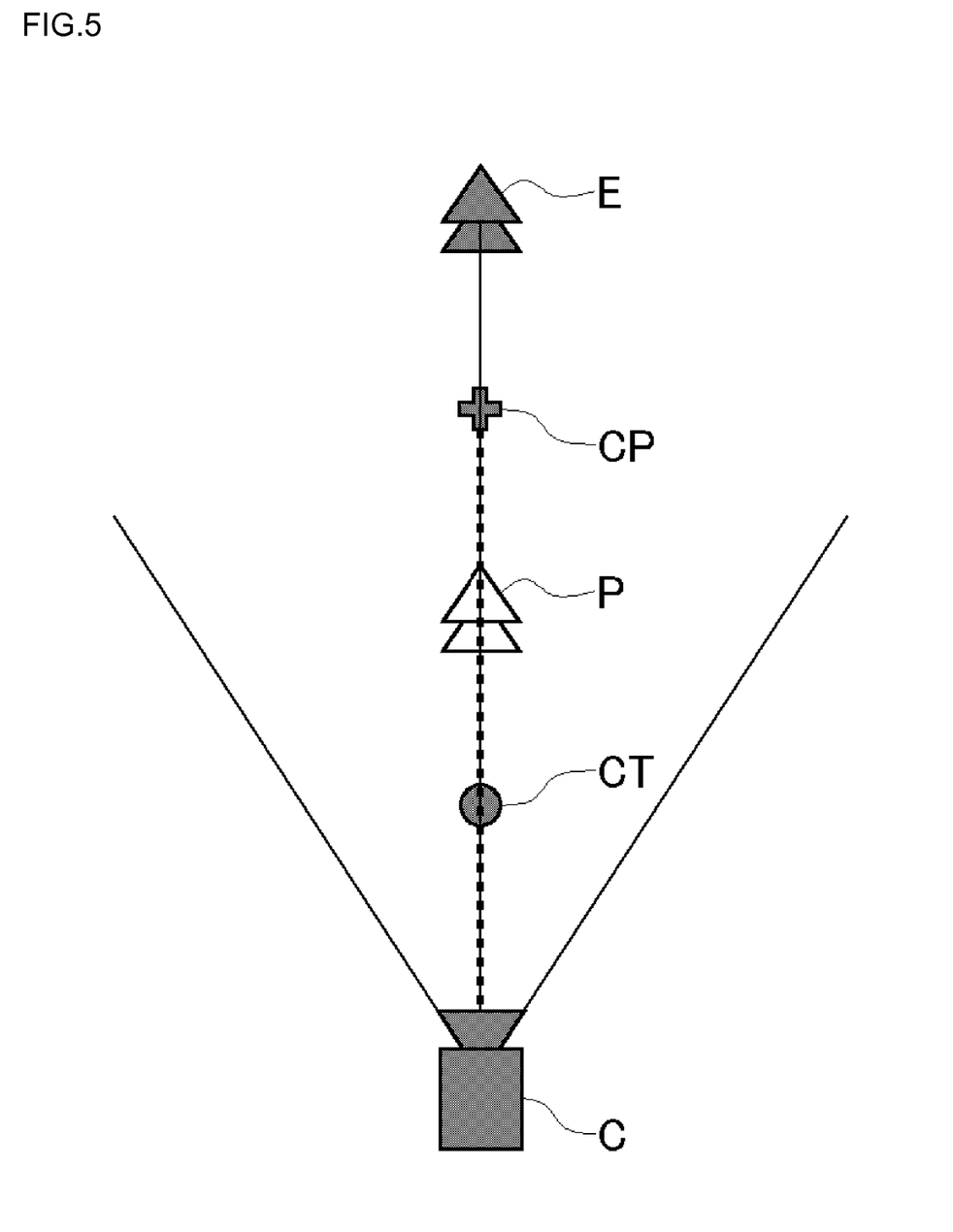
FIG. 5 shows an example non-limiting diagram illustrating the attention function (in a case where a player object is moved in a direction to be distant from a virtual camera)

FIG. 5 shows an example non-limiting diagram illustrating a case where the player object P moves in a direction away from the virtual camera C. In an example in FIG. 5, the player object P moves toward the attention enemy object E.

In this case, the virtual camera C, the target position CT thereof, and the player object P are arranged in a straight line, and the virtual camera C, the player object P, and the middle point CP between the player object P and the attention enemy object E are arranged in a straight line, and thus the virtual camera C faces the player object P from a position immediately behind the player object P, and follows the player object P. In this case, as is clear from comparison with the case of FIG. 3, when a distance between the player object P and the virtual camera C increases, the player object P looks small in the captured screen. The player can obtain a feeling of speed, which is appropriate for a depth direction and a forward direction of the player object, due to a variation in a size of the player object P in the captured screen.

Effect Due to Facing of Virtual Camera to Middle Point

In addition, the virtual camera setting unit 281 of this example sets the direction of the virtual camera C in such a manner that the center of the imaging range V faces the middle point CP between the attention enemy object E as the attention object and the player object P instead of facing the attention enemy object E as the attention object and instead of facing the player object P. Accordingly, even when the delay occurs, both the player object P and the attention enemy object E can enter the imaging range V. In addition, when the virtual camera C faces the middle point CP, an amount of a variation in the direction of the virtual camera C decreases, and thus it is possible to provide a game screen in which motion sickness is less likely to occur even with close observation.

Figure 6:
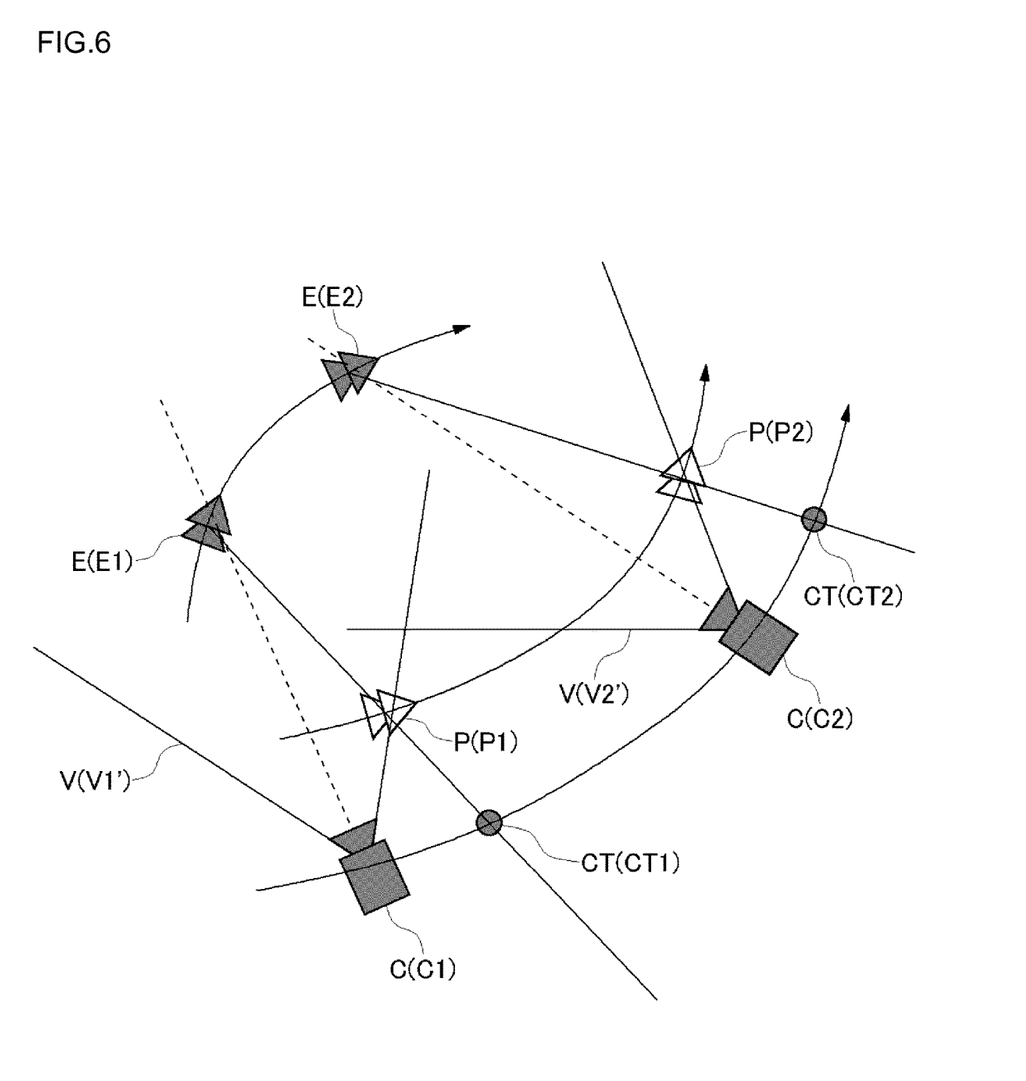
FIG. 6 shows an example non-limiting diagram illustrating the attention function (in a case where a direction of the virtual camera is set to face an attention enemy object)

FIG. 6 illustrates a case where the direction of the virtual camera C in the example of FIG. 3 is set to face the attention enemy object E. In the case of FIG. 6, the attention enemy object E is located in the vicinity of the center of the imaging range V, but it is easy for the player object P to protrude from the imaging range V. In the example of FIG. 6, at time T1, a part of the player object P1 deviates from an imaging range V1', and at time T2, a part of the player object P2 also deviates from imaging range V2'.

Figure 7:
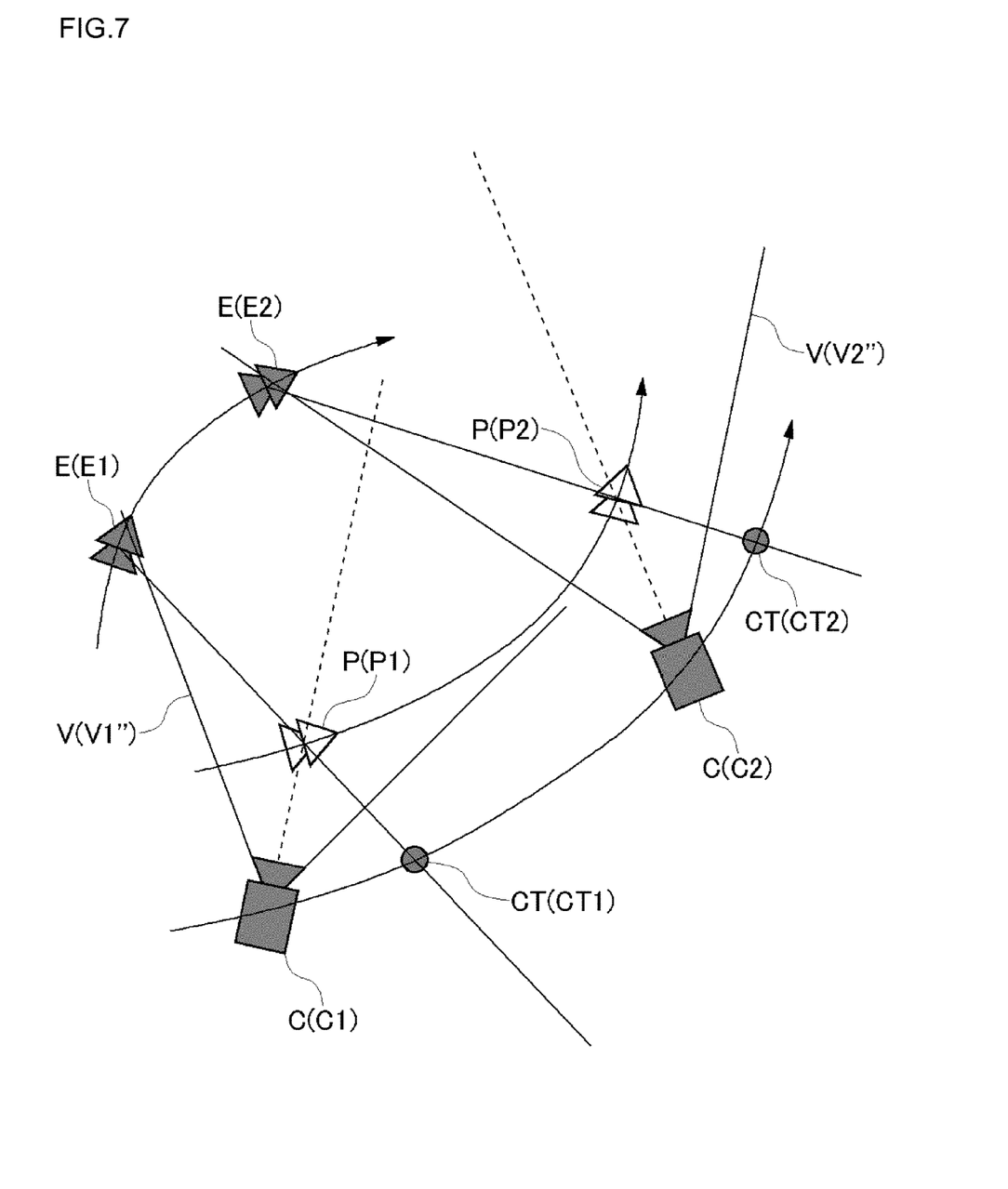
FIG. 7 shows an example non-limiting diagram illustrating the attention function (in a case where the direction of the virtual camera is set to face the player object).

FIG. 7 illustrates a case where the direction of the virtual camera C in the example of FIG. 3 is set to face the player object P. In the case of FIG. 7, the player object P is located in the vicinity of the center of the imaging range V, but it is easy for the attention enemy object E to protrude from the imaging range V. In the example of FIG. 7, at time T1, a part of the attention enemy object E1 deviates from an imaging range V1", and at time T2, a part of the attention enemy object E2 also deviates from an imaging range V2". In addition, in the case of FIG. 7, the position of the player object on the captured image is fixed to the vicinity of the center thereof, and thus dynamic properties of a camerawork are damaged.

In contrast, since the virtual camera setting unit 281 of this example sets the direction of the virtual camera C in such a manner that the center of the imaging range V faces the middle point CP between the attention enemy object E and the player object P, it is possible to solve the problem in the case of FIG. 6 or FIG. 7.

Slow Motion During Short-Distance Passing-Each-Other

Next, as an additional function in the attention function, a slow motion during passing-each-other will be described. As described above, the virtual camera setting unit 281 of this example moves the virtual camera C simply in conformity to the player object P, and sets the position and the direction of the virtual camera C on the basis of a positional relationship between the player object P and the attention enemy object E in such a manner that the attention enemy object E enters the imaging range V. Accordingly, in a case where the player object P and the attention enemy object E pass each other in a short distance, the direction of the virtual camera C rapidly varies. In this case, a variation in the game screen is great, and thus the player tends to lose the position or the direction of the player object P.

Here, in a case where the player object P and the attention enemy object E pass each other in a short distance that is equal to or shorter than a predetermined distance, the captured screen operation unit 282 generates a slow motion screen as the game screen. On the other hand, as is the case with the above-described embodiment, the virtual camera setting unit 281 sets the position and the direction of the virtual camera C. According to this, even when the player object P and the attention enemy object E pass each other in a short distance, it is less likely to lose the position or the direction of the player object P.

Attention Mode

Next, description will be given of a method (attention mode) of validating the attention function by setting an object that is the attention object. First, in the above description, the attention function has been described with reference to a case where an object (hereinafter, referred to as an attention object) is the enemy object as an example, but the attention object may be an object that is a stationary object such as a construction that is set in the virtual space without limitation to the enemy object. Examples of the attention mode include automatic attention, semi-automatic attention, and manual attention.

In the automatic attention, the player does not perform a specific operation, and the attention object is automatically set, and thus the attention function is automatically validated. That is, in the case of the automatic attention, the attention function is automatically initiated, and a specific object is always set as the attention object.

In the semi-automatic attention, an object (attention object candidate), which can become the attention object, is fixed (determined in advance), but whether or not validate the attention function is determined in accordance with operation by the player. In the semi-automatic attention, the attention function may be validated during the period in which the operation (for example, pressing of a button) by the player is carried out, or the attention function may be validated after the operation for initiation of the attention function is performed by the player until the operation for release of the attention function is performed by the player.

In the automatic attention or the semi-automatic attention, for example, the strongest enemy character or the largest stationary object in the virtual space may be set as the attention object. In a case where the attention object is large, a reference point of the attention object, which is used to determine the position and the direction of the virtual camera, may be set to be variable in accordance with the position and/or the direction of the player object.

For example, in a case where the attention object is a stationary object, and the height thereof is high, if the position of the player object is from the ground is high or low, as is the case with the above-described embodiment, the position and the direction of the virtual camera may be set with an upper side or a lower side of the attention object set as a reference point. In this case, a plurality of reference points, in which height is different in each case, are prepared in advance, and then a reference point corresponding to the altitude of the player object may be selectively used, or the height of the reference point may be made to linearly vary in accordance with the altitude of the player object.

In the manual attention, a plurality of objects (attention object candidates), which can become the attention object, exist, and the attention object is determined among the attention object candidates in accordance operation of the player, and thus the attention function is validated. Also in the manual attention, the attention function may be validated only during the period in which the operation by the player is carried out, or the attention function may be validated after the operation for initiation of the attention function is performed until an operation for release of the attention function is performed by the player.

In the manual attention, in a case where an attention object candidate appears in a state in which the attention function is not validated, a marker is given to the attention object candidate. When the player operates the player object and selects the attention object candidate, to which a marker is given, as the attention object, the attention function is validated with the attention object candidate set as the attention object.

In the semi-automatic attention and the manual attention, in a case other than a case where the attention function is actively invalidated by the operation of the player, the attention function is released when a predetermined condition is satisfied. For example, in a case where the attention object is the enemy object, of the attention enemy object is attacked and disappears, the attention function is released. In addition, when the attention enemy object is violently rolled, the attention function may be released.

The setting of the attention object and the validation and invalidation (release) of the attention function as described above are carried out by the game operation unit 27 in accordance with a game program on the basis of an input by the player.

Control Considering Direction of Player Object with Respect to Attention Object

In the above-described example, the position and the direction of the virtual camera are set on the basis of only the position of the attention object and the player object, the position and the direction of the virtual camera may be set in consideration of the direction of the player object with respect to the attention object. Specifically, the direction of the camera may set in accordance with a direction between a direction of the player object which faces the attention object, and a direction (proceeding direction) of the player object.

OTHER MODIFICATION EXAMPLES

In the above-described example, the virtual camera setting unit 281 sets the position and the direction of the virtual camera. However, in addition to or instead of the position and direction, the virtual camera setting unit 281 may set the angle of view of the virtual camera to be variable on the basis of a positional relationship between the player object and the attention object.

In addition, in the example, the virtual camera setting unit 281 sets the direction of the virtual camera to face the middle point between the player object and the attention object. However, there is no limitation thereto, and the direction of the virtual camera may be set in such a manner that the virtual camera faces a point that divides a line segment between the player object and the attention object in a predetermined ratio (for example, 2:1) other than 1:1.

In addition, in the above-described example, the objective viewpoint image is displayed on the display device 30, and the subjective viewpoint image is displayed on the controller screen 11. However, in contrast, the objective viewpoint image generated by the image generation unit 28 of the embodiment may be displayed on the controller screen 11, and the subjective viewpoint image may be displayed on the display device 30. In addition, where to display the objective viewpoint image and the subjective viewpoint image between the display device 30 and the controller screen 11 may be switched in accordance with operation of the user.

In addition, the controller 10 including the controller screen 11 in this embodiment may not be exclusively used for the game system 100. For example, the controller 10 may be a portable display device of a tablet computer, a smart phone, and the like which include an input section and a touch panel as a display section.

What is claimed is:

1. An information processing apparatus for generating an image obtained by imaging a player object and an attention object in a virtual space by using a virtual camera, the information processing apparatus comprising:
    at least one processor configured to:
    control at least a position of the player object with any degree of freedom based on an input by a player;
    set an object in the virtual space as the attention object; and
    perform attention control for controlling position and direction of the virtual camera in such a manner that both of the player object and the attention object are included in an imaging range of the virtual camera based on the position of the player object and a position of the attention object, wherein when performing attention control, the degree of freedom of controlling the position is not limited,
    wherein the attention control is executed during a period of time in which a first user interface receives a first preset operation, or during a period of time starting from when a second user interface receives a second preset operation to activate the attention control and ending when the second user interface receives another preset operation.

2. The information processing apparatus according to claim 1,
    wherein the at least one processor is further configured to control an angle of view of the virtual camera.

3. The information processing apparatus according to claim 1,
    wherein the at least one processor is configured to perform the attention control such that the attention object is included in a vicinity of a center of the imaging range of the virtual camera.

4. The information processing apparatus according to claim 1,
    wherein the at least one processor is configured to perform the attention control such that the player object is included in a vicinity of a center of the imaging range of the virtual camera.

5. The information processing apparatus according to claim 1,
    wherein the at least one processor is configured to move the virtual camera toward a target position based on a positional relationship between the player object and the attention object.

6. The information processing apparatus according to claim 1,
    wherein the at least one processor is configured to control a direction of the virtual camera so as to face a point between the player object and the attention object.

7. The information processing apparatus according to claim 1,
    wherein an image, which is obtained by virtually imaging the virtual space by using another virtual camera that is separate from the virtual camera, is generated.

8. The information processing apparatus according to claim 7, wherein the another virtual camera is controlled in accordance with a direction of the player object.

9. The information processing apparatus according to claim 8,
wherein the image captured by the another virtual camera is displayed on a portable display device that includes an input section for receiving an input.

10. The information processing apparatus according to claim 1,
wherein the first user interface or the second user interface is a button.

11. The information processing apparatus according to claim 1,
wherein the attention control comprises at least one of semi-automatic attention control and manual attention control.

12. The information processing apparatus according to claim 11,
wherein in the semi-automatic attention control, a default object is set to the attention object from among a plurality of object candidates.

13. The information processing apparatus according to claim 12,
wherein the default object is automatically determined based on a specific criterion.

14. The information processing apparatus according to claim 13,
wherein the specific criterion is a strength of an object or size of an object.

15. The information processing apparatus according to claim 11,
wherein in the manual attention control, the at least one processor receives a selection of one object from a plurality of candidate objects and sets the selected object as the attention object.

16. The information processing apparatus according to claim 1,
wherein the attention control is configured to end prior to the receipt of the another preset operation when a predetermined condition occurs, or wherein the attention control is configured to end when a predetermined condition occurs while the first preset operation is being received.

17. The information processing apparatus according to claim 1, wherein the at least one processor configured to:
control a direction which the player object faces with any degree of freedom based on an input by a player, wherein when performing attention control, the degree of freedom of controlling the direction is not limited.

18. An information processing system for generating an image obtained by imaging a player object and an attention object in a virtual space by using a virtual camera, the information processing system comprising:
a controller; and
at least one processor,
the at least one processer being configured to:
control at least a position of the player object with any degree of freedom based on an input to the controller by a player;
set an object in the virtual space as the attention object;
perform attention control for controlling position and direction of the virtual camera in such a manner that both of the player object and the attention object are included in an imaging range of the virtual camera based on the position of the player object and a position of the attention object, wherein when performing attention control, the degree of freedom of controlling the position is not limited, and
generate an image captured by the virtual camera,
wherein the attention control is executed during a period of time in which a first user interface receives a first preset operation, or during a period of time starting from when a second user interface receives a second preset operation to activate the attention control and ending when the second user interface receives another preset operation.

19. An information processing method for generating an image obtained by imaging a player object and an attention object in a virtual space by using a virtual camera, the method comprising:
receiving an input by a player;
controlling at least a position of the player object with any degree of freedom on the basis of the input;
setting an object in the virtual space as the attention object; and
performing attention control for controlling position and direction of the virtual camera in such a manner that both of the player object and the attention object are included in an imaging range of the virtual camera based on the position of the player object and a position of the attention object, wherein when performing attention control, the degree of freedom of controlling the position is not limited,
wherein the attention control is executed during a period of time in which a first user interface receives a first preset operation, or during a period of time starting from when a second user interface receives a second preset operation to activate the attention control and ending when the second user interface receives another preset operation.

20. A non-transitory computer-readable recording medium that stores an information processing program for generating an image obtained by imaging a player object and an attention object in a virtual space by using a virtual camera, the information processing program, when executed by a computer, causing the computer to execute:
receiving an input by a player;
controlling at least a position of the player object based on the input;
setting an object in the virtual space as the attention object; and
performing attention control for controlling position and direction of the virtual camera in such a manner that both of the player object and the attention object are included in an imaging range of the virtual camera based on the position of the player object and a position of the attention object, wherein when performing attention control, the degree of freedom of controlling the position is not limited,
wherein the attention control is executed during a period of time in which a first user interface receives a first preset operation, or during a period of time starting from when a second user interface receives a second preset operation to activate the attention control and ending when the second user interface receives another preset operation.

21. An information processing apparatus for generating an image obtained by imaging a player object and an attention object in a virtual space by using a virtual camera, the information processing apparatus comprising:
at least one processor configured to:
control at least a position of the player object based on an input by a player;

set an object in the virtual space as the attention object;
perform attention control for controlling position and direction of the virtual camera in such a manner that both of the player object and the attention object are included in an imaging range of the virtual camera based the position of the player object and a position of the attention object,
wherein during the attention control, the position of the virtual camera is updated periodically based on movement of the player object and the attention object whereby the position of the virtual camera moves toward a target position, the target position being along a line segment connecting the player object and the attention object and is spaced away from the player object toward a side opposite to the attention object, and the center of an imaging range of the virtual camera faces the point dividing the line segment between the player object and the attention object in a predetermined ratio, and wherein the player object and the attention object are displayed.

22. The information processing apparatus according to claim 21,
wherein the at least one processor updates the position of the player object, the position of the attention object and the position and the direction of the virtual camera frame by frame.

23. The information processing apparatus according to claim 21,
wherein the predetermined ratio is 1:1.

24. The information processing apparatus according to claim 21, wherein the movement of the virtual camera is delayed with respect to the movement of the player object.

* * * * *